(12) United States Patent
Abe (10) Patent No.: US 9,724,885 B2
(45) Date of Patent: Aug. 8, 2017

(54) MOLD PIN, TIRE MOLD AND TIRE MANUFACTURING METHOD

(71) Applicant: SUMITOMO RUBBER INDUSTRIES, LTD., Kobe-shi, Hyogo (JP)

(72) Inventor: Shotaro Abe, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 818 days.

(21) Appl. No.: 13/966,552

(22) Filed: Aug. 14, 2013

(65) Prior Publication Data

US 2014/0103577 A1    Apr. 17, 2014

(30) Foreign Application Priority Data

Oct. 11, 2012  (JP) .................................. 2012-226275

(51) Int. Cl.
*B29D 30/06*   (2006.01)
*B29D 30/66*   (2006.01)

(52) U.S. Cl.
CPC ..... *B29D 30/0662* (2013.01); *B29D 30/0606* (2013.01); *B29D 30/66* (2013.01); *B29D 2030/0612* (2013.01)

(58) Field of Classification Search
CPC . B29D 30/0662; B29D 30/0606; B29D 30/66
USPC .......................................... 264/326; 425/28.1
See application file for complete search history.

(56) References Cited

U.S. PATENT DOCUMENTS

| | | | | | |
|---|---|---|---|---|---|
| 3,179,146 | A | * | 4/1965 | Edsmar | B60C 11/16 152/210 |
| 3,237,670 | A | * | 3/1966 | Hutchinson | B60C 11/16 152/211 |
| 3,717,927 | A | * | 2/1973 | Smith | B21K 25/00 29/517 |
| 3,987,831 | A | * | 10/1976 | Walrave | B60C 11/165 152/167 |
| 4,844,137 | A | * | 7/1989 | Einarsson | B60C 11/16 152/210 |
| 5,800,649 | A | * | 9/1998 | Eromaki | B29D 30/66 156/114 |

(Continued)

FOREIGN PATENT DOCUMENTS

EP    2 202 096 A2    6/2010

OTHER PUBLICATIONS

Extended European Search Report, dated Jan. 21, 2014, for European Application No. 13180808.1.

*Primary Examiner* — Nahida Sultana
(74) *Attorney, Agent, or Firm* — Birch, Stewart, Kolasch & Birch, LLP (57) ABSTRACT

A mold pin fixed to a tread mold for a tire tread and forming a stud hole is disclosed. The mold pin is provided at one end of its main shaft portion with an expanded portion having a larger outer diameter. The expanded portion comprises a supporting part formed integrally with the main shaft portion, and an outer-shell part disposed on the outer surface of the supporting part to define the maximum outer diameter of the expanded portion. When a force directed from the main shaft portion toward the expanded portion is applied to the outer-shell part, the outer-shell part is moved so as to reduce the maximum outer diameter.

12 Claims, 8 Drawing Sheets

(56) References Cited

U.S. PATENT DOCUMENTS

| | | | | |
|---|---|---|---|---|
| 6,199,610 B1* | 3/2001 | Yanagawa | ............ | B60C 11/1618 152/209.5 |
| 2004/0079471 A1* | 4/2004 | Brivio | .................... | B29D 30/66 156/114 |
| 2007/0187117 A1* | 8/2007 | Tanaka | .................... | B22F 5/007 172/1 |
| 2008/0277038 A1* | 11/2008 | Guichon | ............ | B29D 30/0606 152/209.1 |
| 2011/0151038 A1* | 6/2011 | Cuny | ................. | B29D 30/0606 425/28.1 |
| 2015/0251367 A1* | 9/2015 | Cocural | ............. | B29D 30/0606 264/219 |
| 2016/0129563 A1* | 5/2016 | Hu | ........................ | B25B 13/463 81/63.2 |

\* cited by examiner

MOLD PIN, TIRE MOLD AND TIRE MANUFACTURING METHOD

BACKGROUND OF THE INVENTION

The present invention relates to a mold pin for forming a hole for a tire stud, a tire mold provided with the mold pins, and a method for manufacturing a tire by the use of the tire mold.

In general, a studded tire for use on ice is manufactured by firstly molding a pneumatic tire having stud holes and then driving tire studs in the stud holes.

Figure 7A:
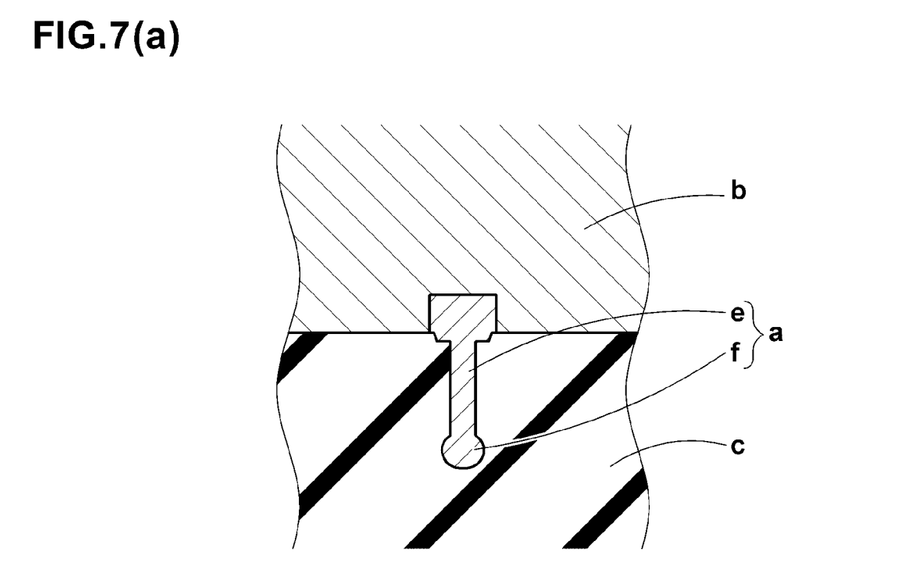
FIG. 7(a) is a cross sectional view of a part of a tread mold having a conventional mold pin inserted in tread rubber.
Figure 7B:
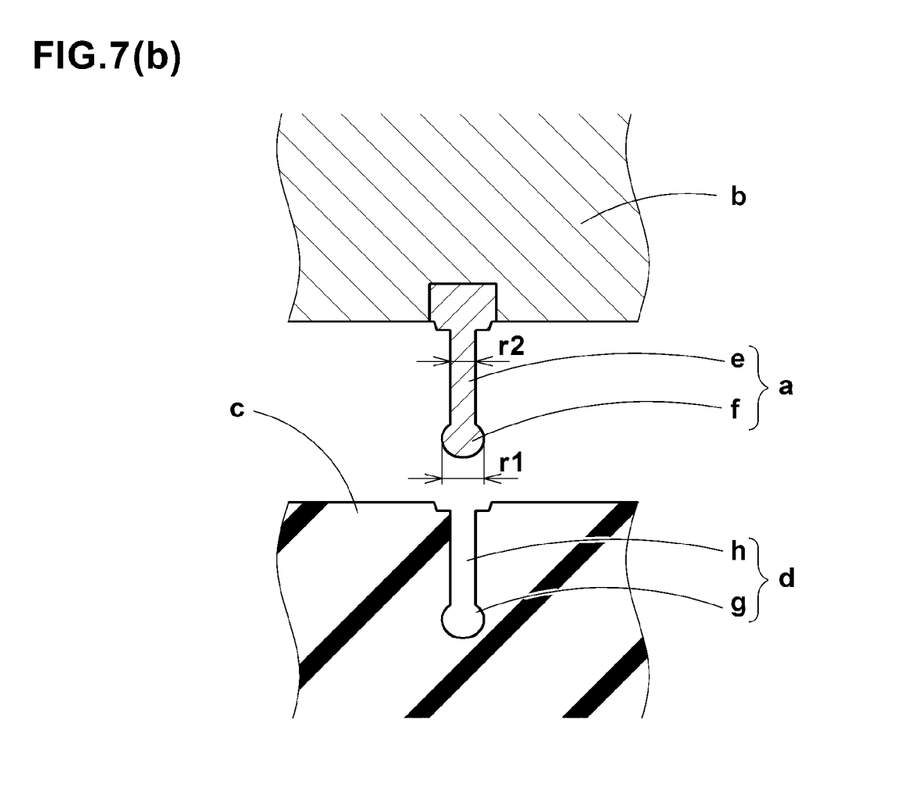
FIG. 7(b) is a cross sectional view of the part of the tread mold having the conventional mold pin pulled out from the vulcanized tread rubber.

As shown in FIGS. 7(a) and 7(b), the stud holes (d) are formed in the tread portion (c) during vulcanizing the tire by the use of mold pins (a) protruding from the inner surface of the tire vulcanizing mold (b).

The mold pin (a) is provided at the tip end thereof with an expanded portion (f) having a larger diameter than its main shaft portion (e) protruding from the mold (b).

Thus, the molded stud hole (d) has a constant diameter part (h) formed by the main shaft portion (e) and an increased diameter part (g) formed by the expanded portion (f).

Figure 8A:
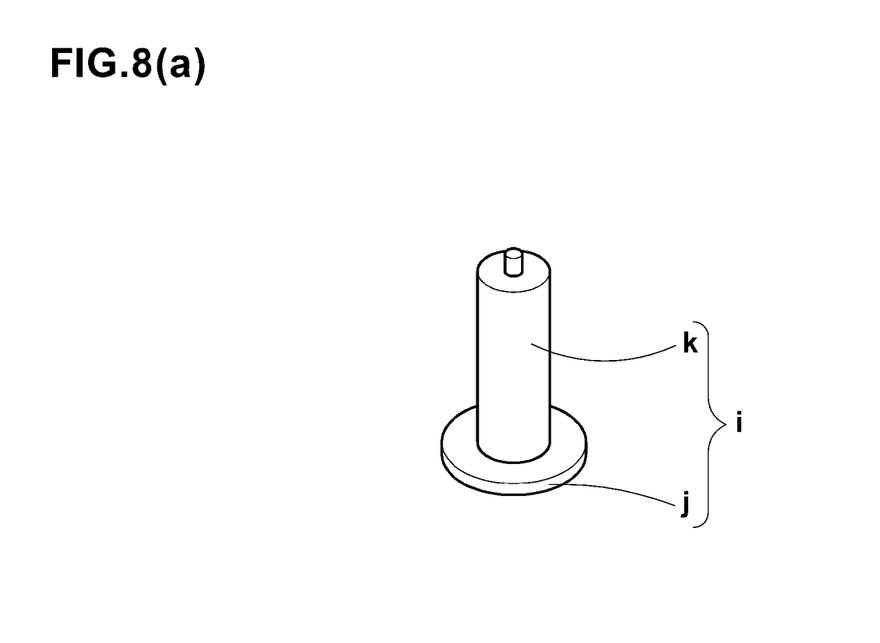
FIG. 8(a) is a perspective view of an ice stud.
Figure 8B:
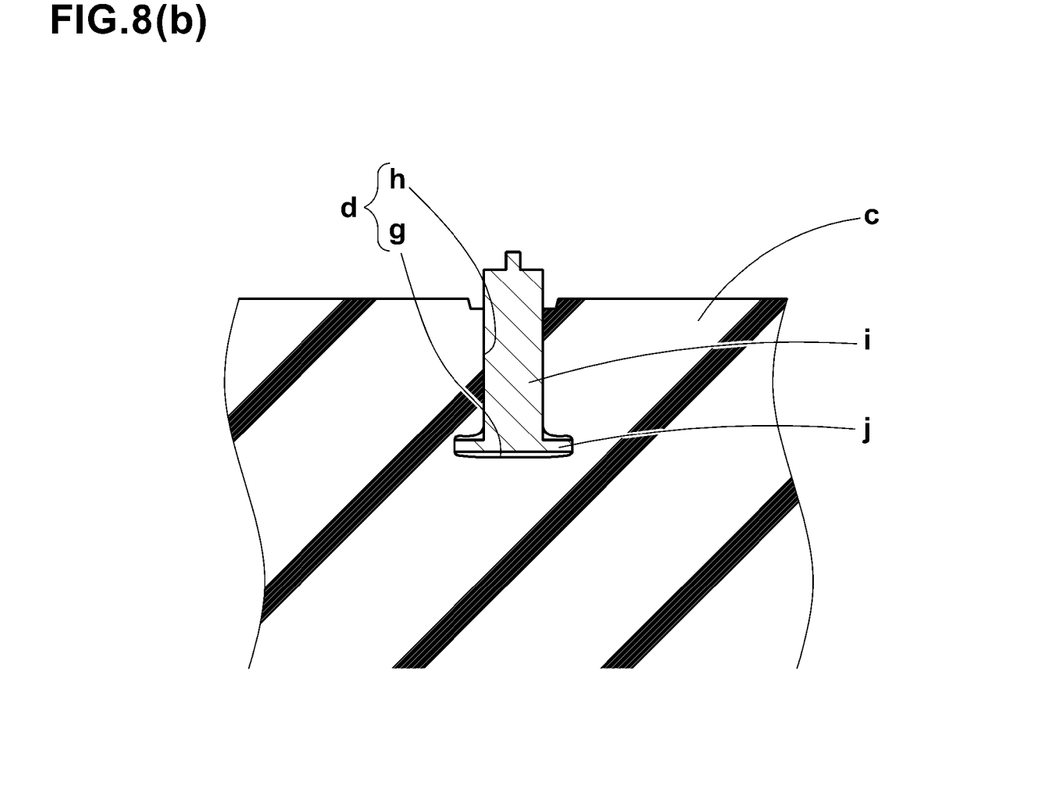
FIG. 8(b) is a cross sectional view of the ice stud driven into the tread portion of the snow tire.

As shown in FIGS. 8(a) and 8(b), an ice stud (i) is provided at one end of its main shaft portion (k) with a flange (j) having a larger diameter than the main shaft portion (k) so as not to drop out from the stud hole (d). The above-mentioned increased diameter part (g) of the stud hole (d) is formed to receive the flange (j).

From a standpoint of prevention of dropping out of a tire stud from a stud hole, it is preferred to increase the diameter difference between the increased diameter part (g) of the stud hole (d) from the constant diameter part (h) by increasing the diameter difference between the expanded portion (f) of the mold pin (a) from the main shaft portion (e).

However, if such diameter difference of the mold pin (a) is increased, it becomes difficult to pull out the mold pin from the vulcanized tire tread after the completion of the tire vulcanization, and there is a possibility that cracks are caused around the stud holes when demolding.

SUMMARY OF THE INVENTION

It is therefore, an object of the present invention to provide a mold pin which can form a stud hole having a large diameter difference without difficulty in pulling out of the mold pin from the molded stud hole and without causing cracks around the stud hole.

According to the present invention, a mold pin used by being fixed to a tread mold for molding a tread of a vehicle tire to form a stud hole in the tread, comprises a main shaft portion to be fixed at its one end to the tread mold so as to protrude from a tread molding surface of the tread mold, and an expanded portion disposed at the other end of the main shaft portion and having an outer diameter more than the outer diameter of the main shaft portion, wherein the expanded portion comprises a supporting part formed integrally with the main shaft portion, and a outer-shell part disposed on the outer surface of the supporting part to define the maximum outer diameter of the expanded portion, and the outer-shell part is movably supported by the supporting part such that when a force directed from the above-mentioned one end toward the above-mentioned other end of the main shaft portion is applied to the outer-shell part, the outer-shell part is moved so as to reduce the maximum outer diameter.

The mold pin according to the present invention may be provided with the following features (1)-(5):

(1) the supporting part is bulb-shaped,
the outer-shell part closely contacts with the outer surface of the supporting part, and
the volumetric thermal expansion coefficient P1 of the supporting part is the same as or more than the volumetric thermal expansion coefficient P2 of the outer-shell part;

(2) the ratio P1/P2 is not less than 1.000 and not more than 1.015;

(3) the ratio D2/D1 of the maximum outer diameter D2 of the expanded portion to the outer diameter D1 of the main shaft portion is not less than 1.2 and not more than 3.0;

(4) the outer-shell part is made up of a plurality of sector shells, and
a radially inside end of each sector shell is connected to the supporting part by the use of a connector made of a heat-resistant, flexible and deformable resin in a cantilever manner;

(5) the maximum outer diameter of the supporting part is more than the outer diameter of the main shaft portion, and
when the sector shell is subjected to a force directed from the above-mentioned one end toward the above-mentioned other end, a radially outside end of the sector shell is movable about the connector as a point of support to a position inside a cylinder circumscribed with the maximum outer diameter position of the supporting part.

According to the present invention, a tire mold comprises a tread mold provided with a plurality of the above-mentioned mold pins.

According to the present invention, a method for manufacturing a vehicle tire comprises a step of vulcanizing a tread portion of the tire by the use of the above-mentioned tread mold.

DESCRIPTION OF THE PREFERRED EMBODIMENTS

Embodiments of the present invention will now be described in detail in conjunction with the accompanying drawings.

Figure 1:
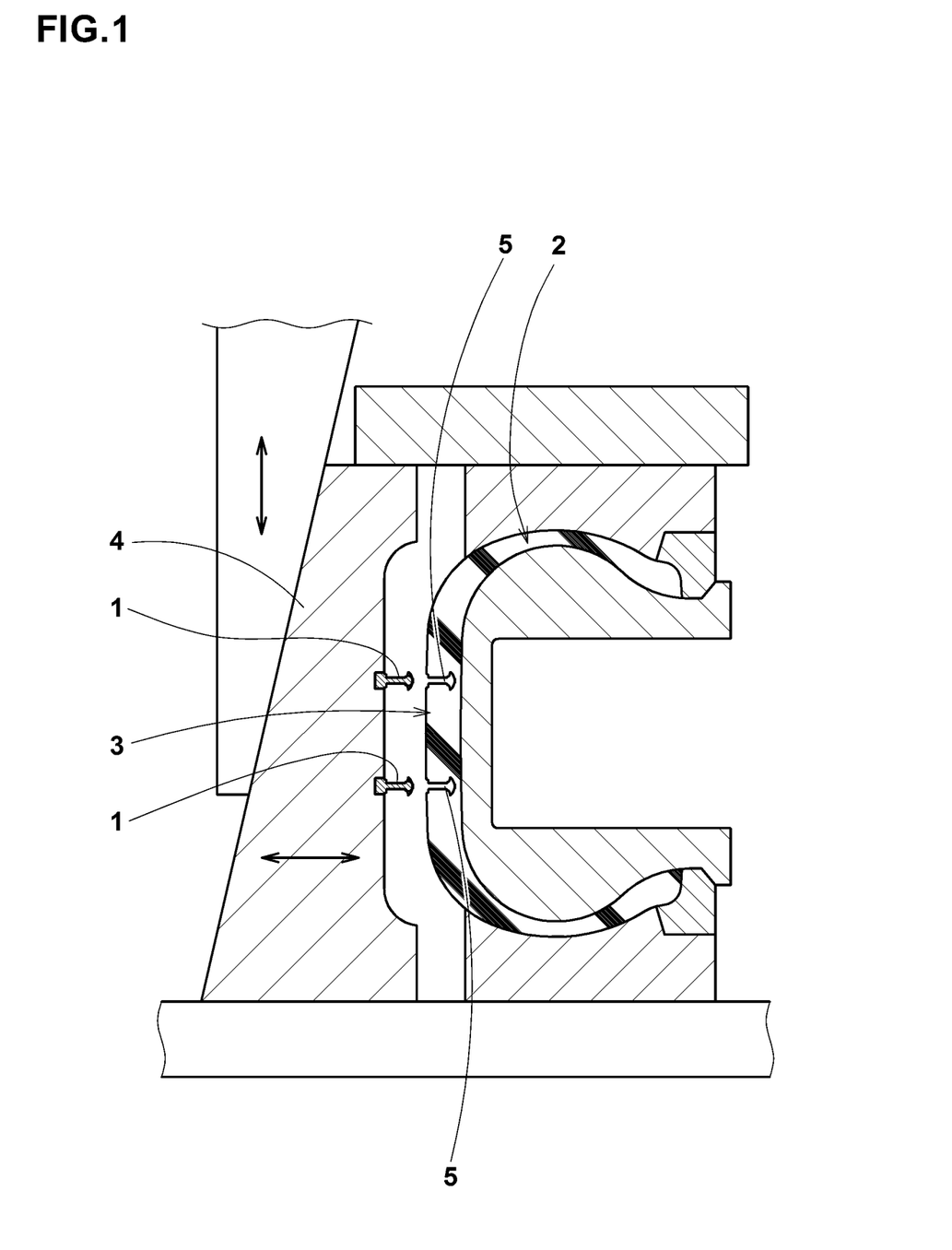
FIG. 1 is a cross sectional view of a pneumatic tire in a tire mold in its semi-opened state.

As shown in FIG. 1, a mold pin 1 as an embodiment of the present invention is fixed to a tread mold 4 for molding the tread portion 3 of a pneumatic tire 2.

During vulcanizing the tire 2, the mold pin 1 is inserted in the tread portion 3 or raw tread rubber and forms a stud hole 5.

Figure 2:
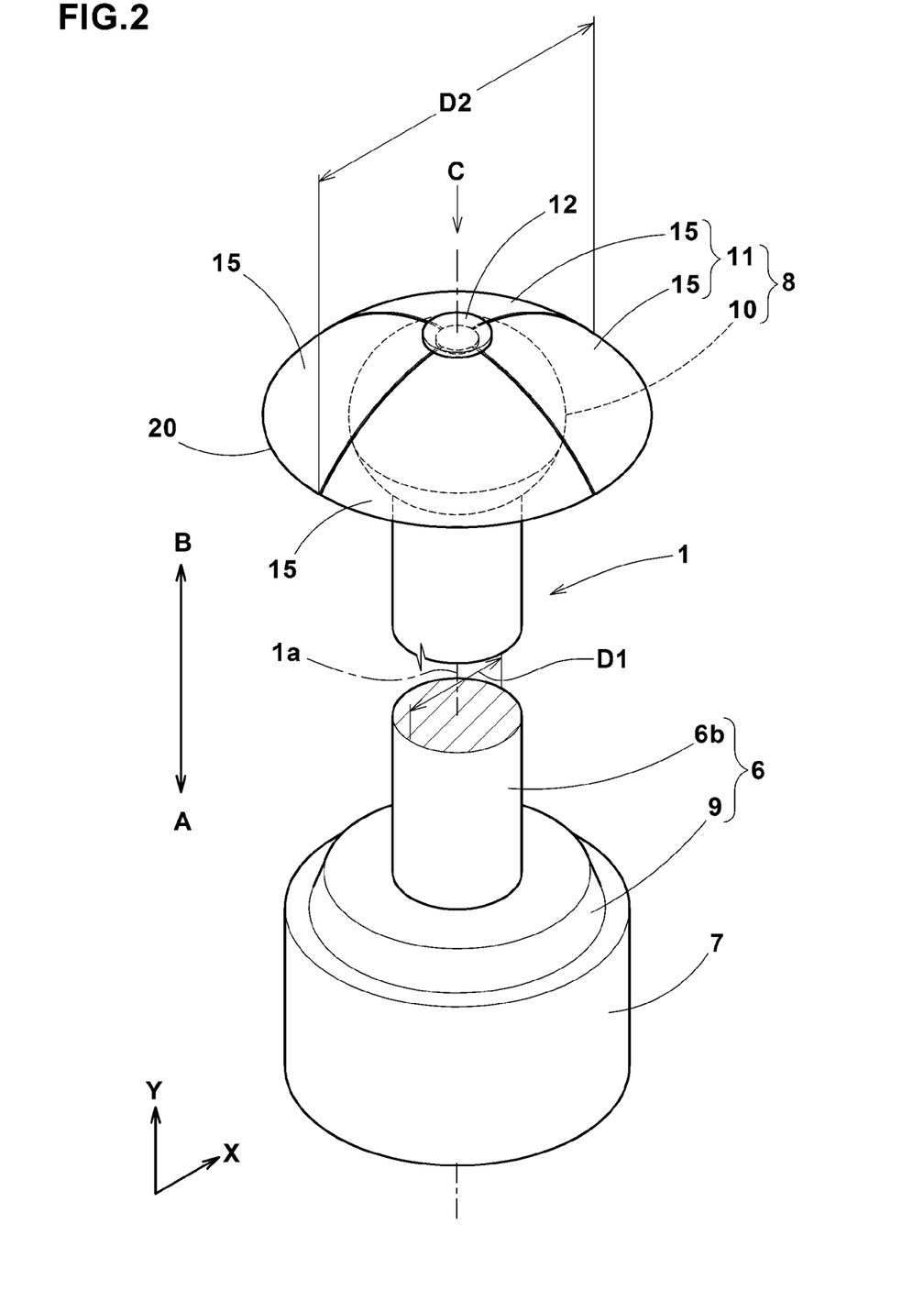
FIG. 2 is a perspective view of a mold pin for forming a stud hole as an embodiment of the present invention.
Figure 3:
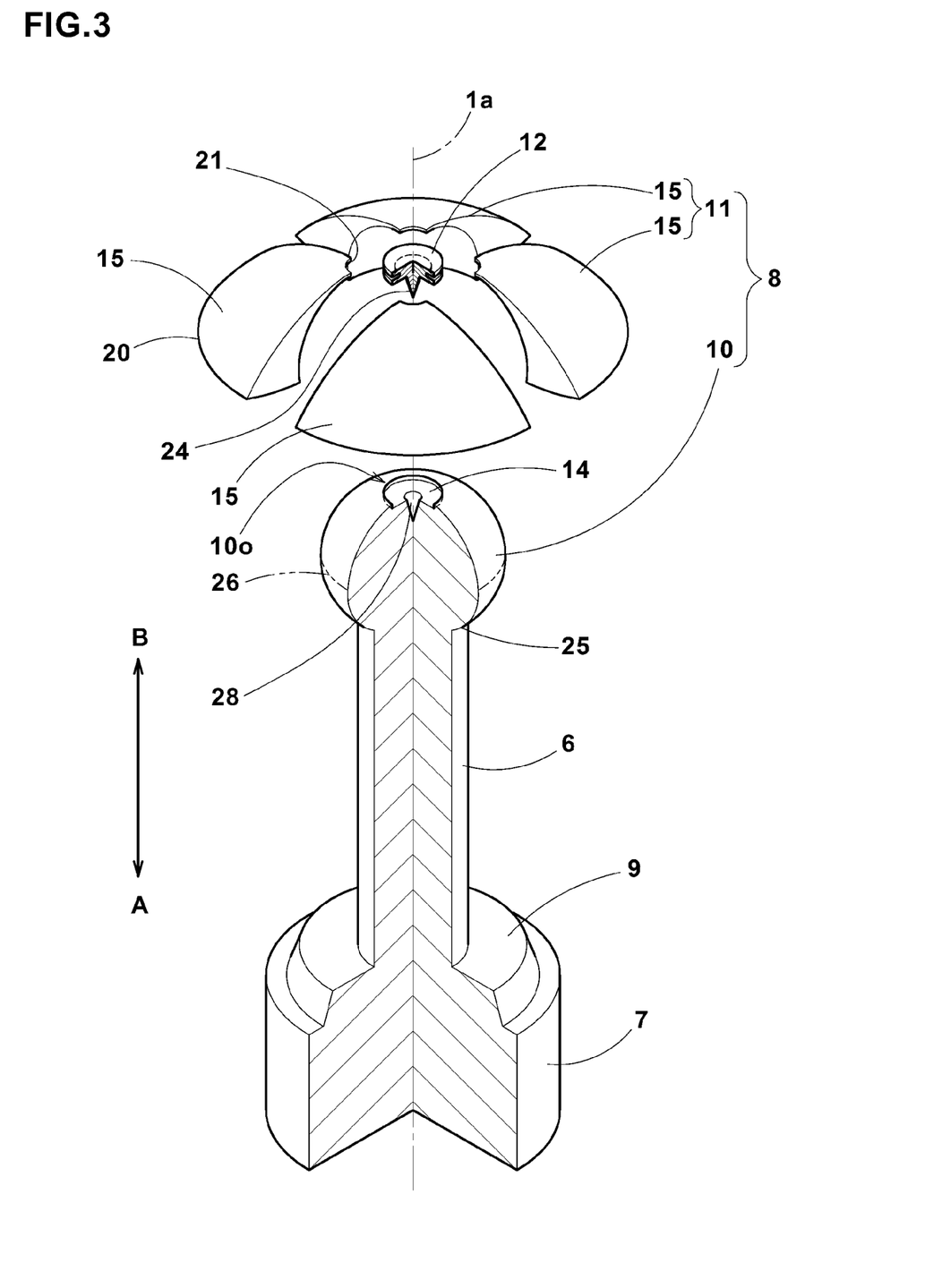
FIG. 3 is an exploded perspective view thereof.

As shown in FIG. 2 and FIG. 3, the mold pin 1 in this embodiment is composed of a main shaft portion 6, a fixed portion 7 formed at one end of the main shaft portion 6 on the root side A and fixed to the tread mold 4, and an expanded portion 8 formed at the other end of the main shaft portion 6 on the tip end side B.
When fixed to the tread mold 4, the main shaft portion 6 extends substantially perpendicularly to the molding surface of the tread mold 4.
In a cross section perpendicular to the axial direction of the main shaft portion 6, the main shaft portion 6 has a circular cross-sectional shape.
As to the cross-sectional shape, however, various shapes such as oval shape and regular polygonal shape may be used according to the cross sectional shape of the stud.

In this specification, the term "axial direction" means a direction parallel with the axis 1a of the mold pin 1 (direction Y in FIG. 2). The term "radial direction" means a direction perpendicular to the axis 1a of the mold pin 1.

The main shaft portion 6 includes a main part 6b having a substantially constant outer diameter for forming a constant diameter part of the stud hole, and an increased diameter part 9 formed on the fixed portion 7 side of the main part 6b The increased diameter part 9 has a variable outer diameter gradually increasing toward the fixed portion 7 side in order to increase the strength of the connecting part between the main shaft portion 6 and the fixed portion 7 and improve the durability of the mold pin 1.

The fixed portion 7 extends from the increased diameter part 9 of the main shaft portion 6, and has a cylindrical shape having an outer diameter larger than the increased diameter part 9. it is preferable to form the fixed portion 7 integrally with the main shaft portion 6.

The outer surface of the fixed portion 7 is threaded (not shown), and screwed into a threaded hole formed in the inner surface of the tread mold 4.

The expanded portion 8 formed on the tip end side B of the main shaft portion 6 has an outer diameter D2 larger than the outer diameter D1 of the main part 6b of the main shaft portion 6 in order to mold an increased diameter part of the stud hole 5 near the bottom.

As shown in FIG. 3, the expanded portion 8 comprises a supporting part 10 formed integrally with the main shaft portion 6 on the tip end side B,
an outer-shell part 11 disposed on the outer surface of the supporting part 10, and
a connector 12 connecting the outer-shell part 11 to the supporting part 10.

The supporting part 10 is bulb-shaped. The maximum outer diameter of the supporting part 10 measured in a plane perpendicular to the above-mentioned axis 1a is more than the outer diameter of the main shaft portion 6.

The supporting part 10 is provided in its end 10o on the tip end side B with a recess 14. At the outer surface of the supporting part 10, the recess 14 has a circular shape centered on the axis 1a for example.

In the recess 14, there is disposed the connector 12 for connecting the outer-shell part 11 to the supporting part 10.

Figure 4:
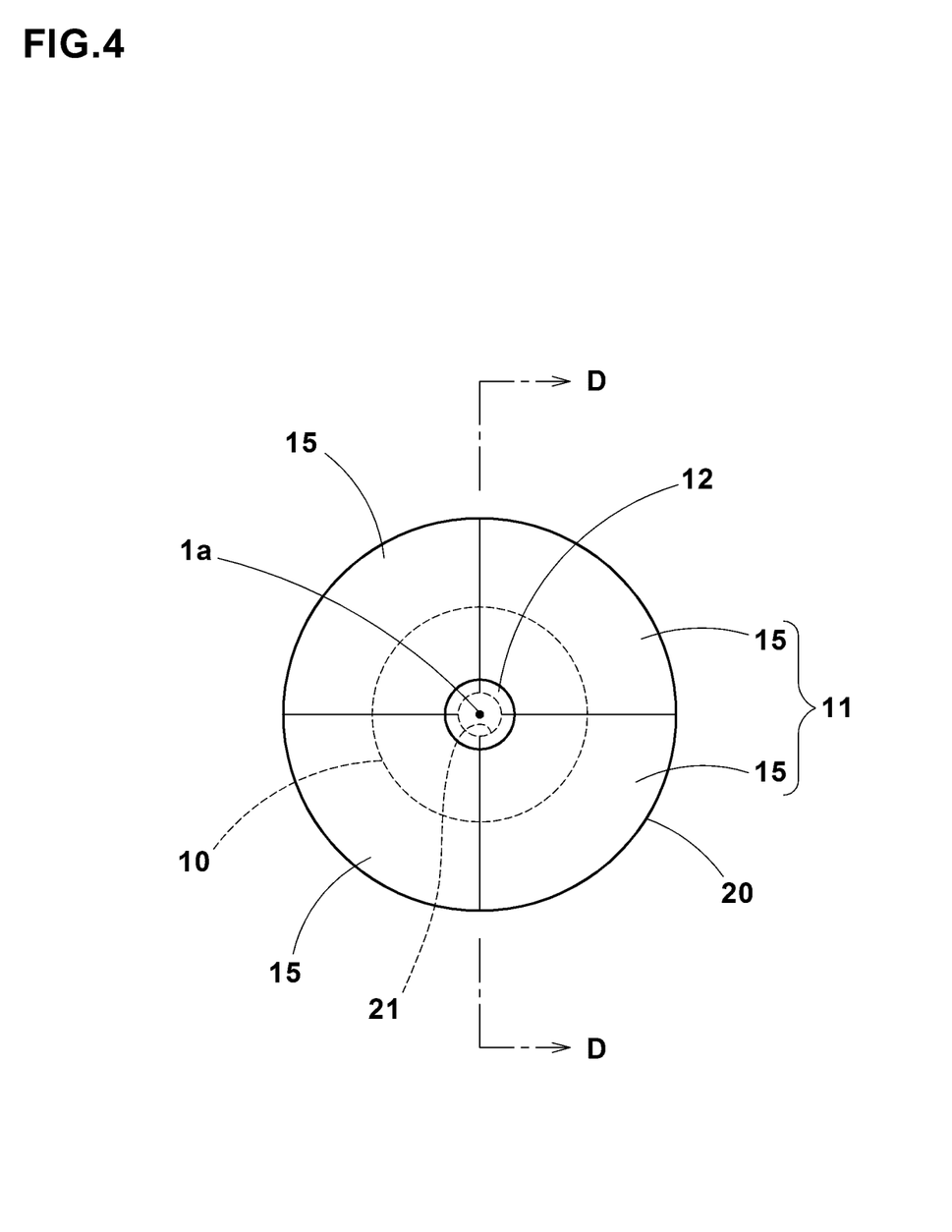
FIG. 4 is a view of the mold pin from the arrow direction c of FIG. 2.

As shown in FIG. 2 and FIG. 3, the outer-shell part 11 is a bowl-shaped movable structure disposed on the tip end side B of the outer surface of the supporting part 10 so as to contact therewith. The outer-shell part 11 covers a part (50% or more) of the outer surface on the tip end side B and forms the maximum outer diameter position 20 of the expanded portion 8. As shown in FIG. 4, viewed from the tip end side B, the maximum outer diameter position 20 has a circular shape.

The outer-shell part 11 is as shown in FIG. 3, made up of a plurality of (in this example, four) sector shells 15. The sector shells 15 are cut by planes each including the axis 1a. The sector shells 15 in this example have an identical shape. In FIG. 4, each sector shell 15 has a sector form. As shown FIG. 3, the thickness of the sector shell 15 increased from its radially inside end 21 to the maximum outer diameter position 20.

The radially inside end 21 of each sector shell 15 is connected to the end 10o of the supporting part 10 by the connector 12.

The connector 12 is, as shown in FIG. 2 and FIG. 3, fixedly disposed in the recess 14 of the mold pin 1. The connector 12 connects the radially inside end 21 of the sector shell 15 to the end 10o of the supporting part 10, and each sector shell 15 is supported by the connector 12 like a cantilever.

The connector 12 is made of a heat-resistant, flexible and largely deformable resin such as silicon resin.

Figure 5A:
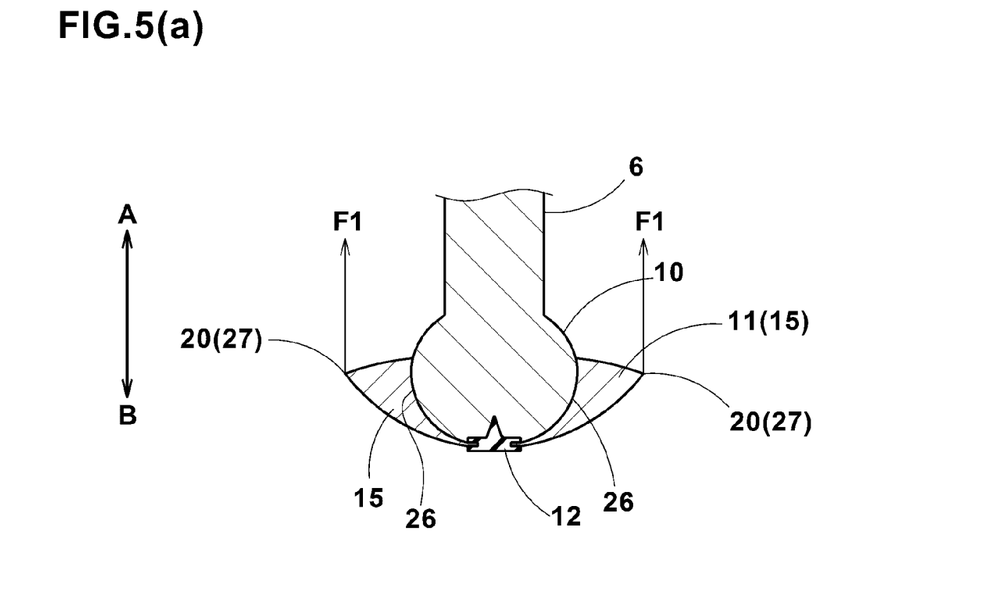
FIG. 5(a) is a cross sectional view of the expanded portion in a normal state such that the outer-shell part defines the maximum outer diameter of the mold pin.

When a force F1 directed from the tip end side B toward the root side A is applied to the mold pin 1 as shown in FIG. 5 (a)—this corresponds to such a situation that the mold pin 1 is being inserted in raw tread rubber, the outer-shell part 11 closely contact with the supporting part 10.

Figure 5B:
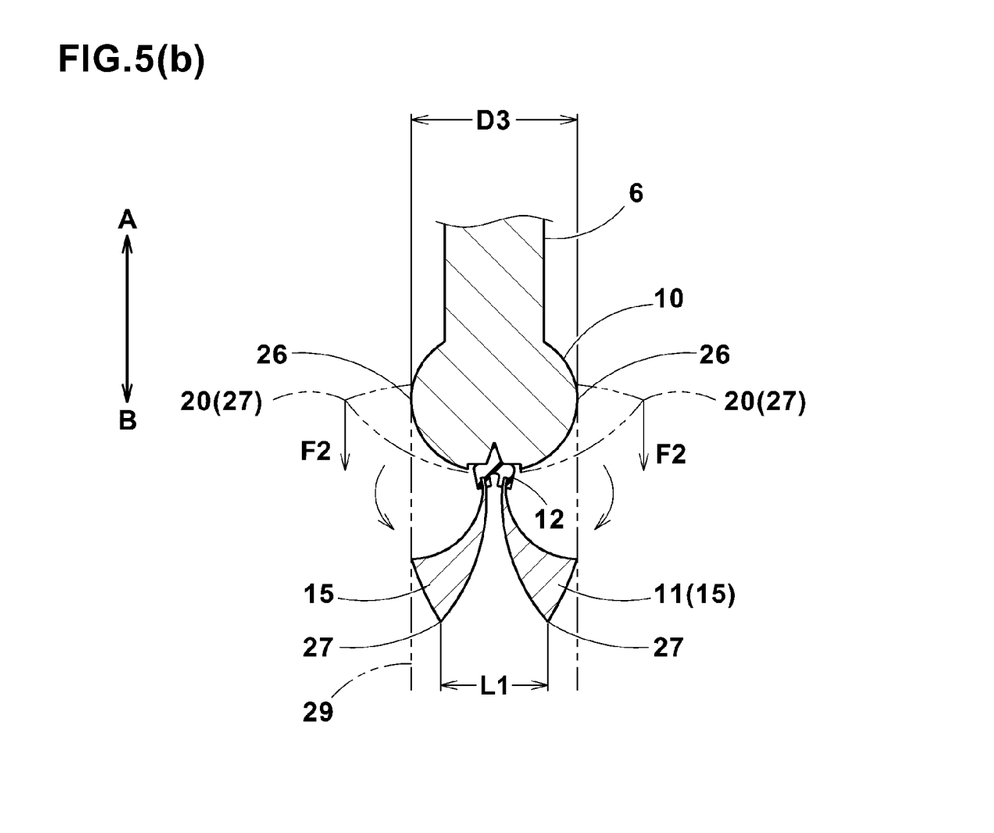
FIG. 5(b) is a cross sectional view of the expanded portion in a contracted state such that the outer-shell part is moved to reduce its outer diameter.
Figure 6:
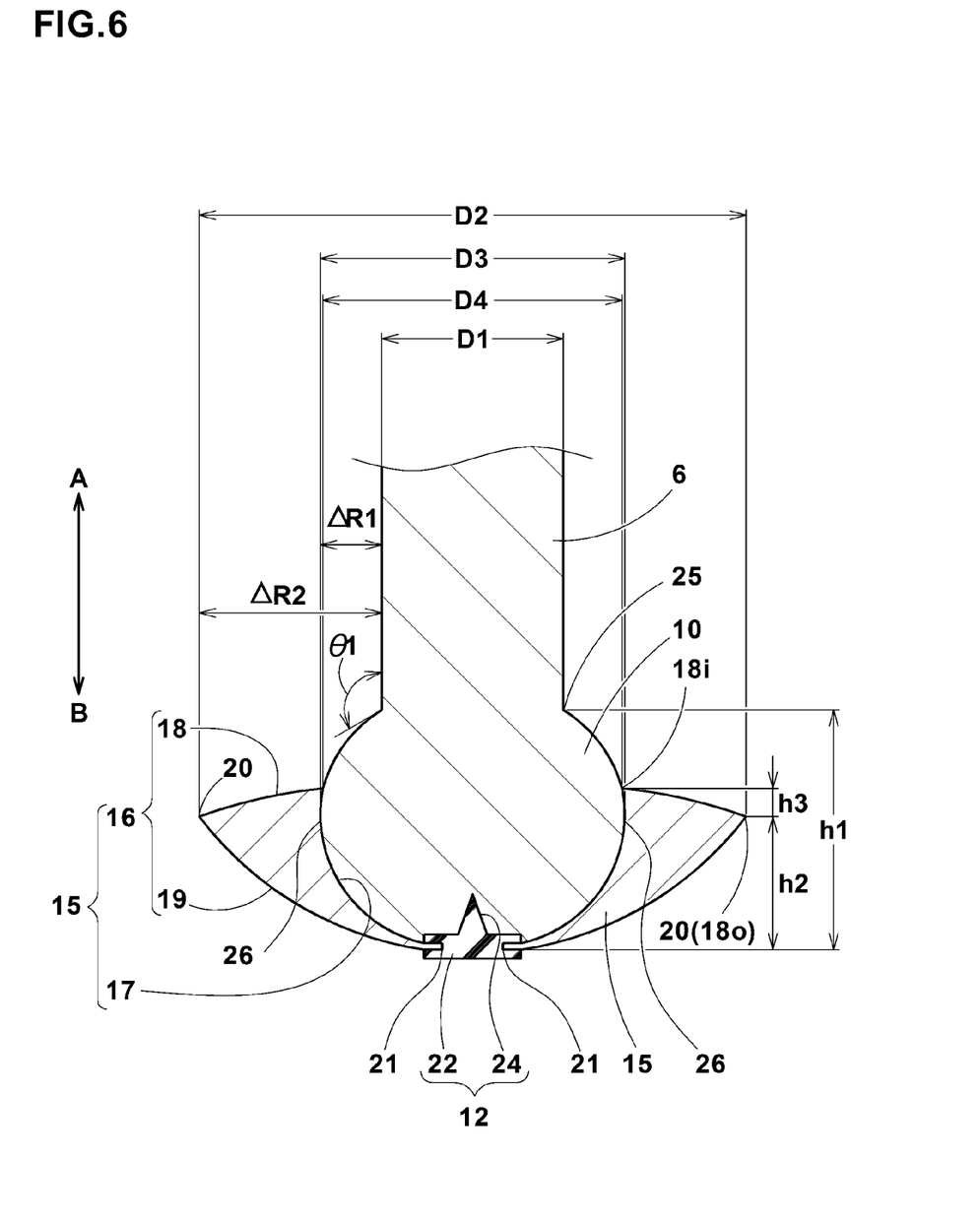
FIG. 6 is a cross sectional view of the expanded portion taken along line D-D in FIG. 4.

The outer-shell part 11 forms the maximum outer diameter position 20 of the expanded portion 8 as shown in FIG. 2 and FIG. 6. In such state, the mold pin 1 stays in the tread rubber until the vulcanization is completed.
After the completion of the vulcanization, the mold pin 1 is pulled out from the tread rubber.
At that time, the outer-shell part 11 is subjected to a face F2 directed from the root side A toward the tip end side B, therefore, as shown in FIG. 5(b), the sector shells 15 are turned about the connector 12 such that the ends 27 of the sector shells 15 are positioned behind the supporting part 10, and the diameter is decreased from D2 to D3.
Accordingly, the mold pin 1 can be readily pulled out from the vulcanized tread rubber. Thus, cracks which are liable to occur in the stud hole 5 when demolding, can be effectively prevented.

When pulled out, as shown in FIG. 5(b), the ends 27 of the sector shells 15 move to the inside of a cylinder 29 circumscribed with the maximum outer diameter position 26 of the supporting part 10, and the distance L1 between the ends 27 is less than the maximum outer diameter D3 of the supporting part 10.

Accordingly, by molding the tread portion 3 with the tread mold 4 provided with the mold pins 1 as shown in FIG. 1, it is possible to provide the stud hole having the increased diameter part having a relatively large diameter, therefore, it is possible to hold a tire stud tightly in the stud hole. Advantageously, this also makes it possible to employ a relatively soft tread rubber compound, therefore, it is possible further improve the grip performance on icy/snowy roads.

In order to effectively derive such advantages, as shown in FIG. 6, the ratio D2/D1 of the maximum outer diameter D2 of the expanded portion 8 to the outer diameter D1 of the main shaft portion 6 is preferably set in a range of not less than 1.2, more preferably not less than 1.7, but not more than 3.0, more preferably not more than 2.5.

The difference ΔR2 in radius between the maximum outer diameter position 20 of the expanded portion 8 and the main shaft portion 6 is set in a range of from 0.35 to 2.0 mm.

If the above-mentioned ratio D2/D1 is more than 3.0, it becomes difficult for the sector shells to turn within the molded stud hole or the sector shells becomes liable to drop out from the supporting part 10.

Preferably, the ratio D3/D1 of the maximum outer diameter D3 of the supporting part 10 to the outer diameter D1 of the main shaft portion 6 is set in a range of more than 1.0, more preferably more than 1.2, but not more than 1.5, more preferably not more than 1.3.

If the ratio D3/D1 is more than 1.5, cracks are liable to occur in the molded stud hole when pulling out the mold pin 1.

Preferably, the difference ΔR1 in radius between the main shaft portion 6 and the supporting part 10 is set in a range of from 0.3 to 1.5 mm.

It is preferable that the maximum outer diameter D3 of the supporting part 10 is in a range of from 3.0 to 9.0 mm.

If the intersecting angle θ1 at the intersection 25 (shown in FIG. 6) between the outer surface of the main shaft portion 6 and the outer surface of the supporting part 10 is small, then the pulling out resistance of the mold pin increases and it becomes difficult to make the demolding. If the intersecting angle θ1 is large, then the stud becomes liable to drop out. Therefore, the intersecting angle θ1 is preferably set in a range of not less than 90 degrees, more preferably not less than 110 degrees, but not more than 150 degrees, more preferably not more than 130 degrees.

The sector shell 15 has an inner surface 17 closely contact with the outer surface of the supporting part 10, and an outer surface 16 coming into contact with the tread rubber of the tread portion 3 when vulcanizing the tire.

The outer surface 16 includes a back face 18 on the root side A of the maximum outer diameter position 20 of the expanded portion 8 and a front face 19 on the tip end side B of the maximum outer diameter position 20.

In a state of the sector shell 15 in which the inner surface 17 closely contact with the outer surface of the supporting part 10 as shown in FIG. 6, it is preferable that the back face 18 is inclined to the tip end side B towards the radially outside from the radially inside, namely, the radially inside end 18i of the back face 18 is positioned on the root side A of the radially outside end 18o of the back face 18. In the cross section including the axis 1a, the back face 18 slightly curved. such configuration facilitates the turning of the sector shells 15 when the mold pin 1 is pulled out from the vulcanized tread portion.

It is preferable that the radially inside end 18i of the back face 18 is disposed on the root side A of the maximum outer diameter position 26 of the supporting part 10.

Preferably, the outer diameter D4 of the supporting part 10 measured at the position at which the radially inside end 18i comes into contact with the supporting part 10 is set to be not less than 0.95 times the maximum outer diameter D3 of the supporting part 10.

Thereby, the contact area between the inner surface 17 and the supporting part 10 is increased, and the shape of the expanded portion 8 during vulcanization becomes stable.

If the distance between the radially inside end 18i and the maximum outer diameter position 26 of the supporting part 10 is increased, there is a possibility that the sector shells 18 become hard to move when pulling out the mold pin.

It is preferable that the radially outside end 18o of the back face 18 is positioned on the root side A of the maximum outer diameter position 26 of the supporting part 10.

Thereby, it becomes possible to increase the radial dimension of the sector shells 15, while maintaining the durability of the sector shells 15.

The front face 19 of the sector shell 15 is curved convexly toward the tip end side B.

In the cross section including the axis 1a, the front face 19 is preferably a circular arc. Thus, the bottom of the stud hole becomes concavely curved. such configuration helps to prevent the occurrence of cracks.

The inner surface 17 of the sector shell 15 has a contour same as the contour of the outer surface of the supporting part 10 so as to close contact therewith. When coming into close contact, the shape of the expanded portion 8 during vulcanization becomes stable.

The ratio h2/h1 of the front face height h2 or the axial length from the maximum outer diameter position 20 of the expanded portion 8 to the radially inside end 21 of the sector shell 15 and the supporting part height h1 or the axial length from the intersection 25 (between the main shaft portion 6 and the supporting part 10) to the radially inside end 21 of the sector shell 15, is preferably set in a range of not less than 0.3, more preferably not less than 0.5, but not more than 1.0, more preferably not more than 0.8.

If the ratio h1/h2 becomes less than 0.3, it becomes difficult to make the shape of the expanded portion 8 during vulcanization stable. If the ratio h1/h2 becomes more than 1.0, the sector shells 15 become hard to move or turn, and the demolding becomes difficult.

Preferably, the ratio h3/h2 of the back face height h3 or the axial length from the maximum outer diameter position 20 of the expanded portion 8 to the radially inside end 18i of the back face 18 of the sector shell 15 to the above-mentioned front face height h2, is not more than 0.5, more preferably not more than 0.3. If the ratio h3/h2 is more than 0.5, the sector shells 15 become hard to move or turn.

If the number of the sector shells 15 is too small, the sector shells 15 become hard to move or turn. If too large, the sector shells 15 are liable to drop out from the connector 12. Therefore, the number of the sector shells 15 is not less than 4, preferably not less than 8, but preferably not more than 16, more preferably not more than 12.

The volumetric thermal expansion coefficient P1 of the supporting part 10 is the same as or more than the volumetric thermal expansion coefficient P2 of the outer-shell part 11. Preferably, the ratio P1/P2 is set in a range of not less than 1.000, more preferably not less than 1.005, but not more than 1.015, more preferably not more than 1.010.

Thereby, during vulcanizing the tire, the supporting part 10 can expand slightly more than the outer-shell part 11, and the supporting part 10 restricts the displacement of the outer-shell parts 11. Thereby, the shape of the expanded portion 8 is stabilized.

Since the sector shell 15 can move or turn about the connector 12 as a point of support as shown in FIG. 5(a) and FIG. 5(b), it is necessary for the connector 12 to withstand the repeated deformation caused by the moving sector shells 15. It is therefore preferable that the connector 12 adheres the outer surface 16 and inner surface 17 of the radially inside end portion (21) of the sector shell 15 as shown in FIG. 6.

The connector 12 in this example comprises a main part 22 and a conically-shaped insert portion 24.

The insert portion 24 extends from the main part 22 towards the root side A in a tapered manner. The insert portion 24 is inserted in a securing hole 28 formed in the recess 14 as shown in FIG. 3. The main part 22 and the insert portion 24 are adhered to the inner surface of the recess 14 and securing hole 28.

Comparison Tests

Based on the structure shown in FIG. 2, mold pins whose specifications are shown in Table 1 were made.

Using a tread mold to which the mold pins were screwed, pneumatic tires having stud holes were molded. Further, for comparison, using the conventional mold pins (Refs. 1-3) shown in FIG. 7, pneumatic tires having stud holes were molded. The tire size was 195/65R15. The vulcanized tread rubber had a JIS durometer A hardness of 53 at 25 deg. C <Occurrence Rate of Crack>

For each kind of mold pin, twenty tires were molded and cut open inspected for cracks.
The cutting plane was a plane parallel with a tire meridian section and passing through the axis of a stud hole.
The cutting positions were four circumferentially different positions at intervals of 90 degrees around the tire rotational axis.

The number of cracked tires par twenty tires was obtained. The results are shown in Table 1.

<Demolding>

As to whether the demolding of the tread mold from the vulcanized tread portion is easy or not, an operator evaluated the mold pins into four ranks:
1: difficult,
2: average
3: easy,
4: very easy <Dropping-Out of Studs>

Ice studs were attached to the test tires. The studded test tires were installed on the front wheels of a test car, a 1500 cc FF passenger car. The test car was run for 25000 km. Then, the number of dropped-out studs were counted and its percentage to the original number of the studs was obtained. The results are shown in Table 1.

From the test results, it was confirmed that, by using the mold pins according to the present invention, the number of drop-out studs can be reduced without increasing the occurrence rate of crack and without deteriorating the demolding.

TABLE 1

| Mold pin | Ref. 1 | Ref. 2 | Ref. 3 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| D1 (mm) | 2.0 | 2.0 | 2.0 | 2.0 | 3.0 | 3.0 | 3.0 | 2.0 | 2.0 | 3.0 | 2.0 | 2.0 |
| D2 (mm) | — | — | — | 5.0 | 5.0 | 5.0 | 6.0 | 6.0 | 6.0 | 6.0 | 6.0 | 5.0 |
| D2/D1 | — | — | — | 2.5 | 1.7 | 1.7 | 2.0 | 3.0 | 3.0 | 2.0 | 3.0 | 2.5 |
| D3 (mm) | 5.0 | 4.0 | 6.0 | 2.5 | 3.5 | 3.5 | 3.5 | 3.0 | 3.0 | 4.5 | 3.0 | 3.0 |
| D3/D1 | 2.5 | 2.0 | 3.0 | 1.3 | 1.2 | 1.2 | 1.2 | 1.5 | 1.5 | 1.5 | 1.5 | 1.5 |
| h1 (mm) | 2.6 | 2.6 | 2.6 | 2.6 | 2.6 | 2.6 | 2.6 | 2.6 | 2.6 | 2.6 | 2.6 | 2.2 |
| h2 (mm) | — | — | — | 1.5 | 1.8 | 1.5 | 1.5 | 1.5 | 1.5 | 1.5 | 1.5 | 1.5 |
| h2/h1 | — | — | — | 0.6 | 0.7 | 0.6 | 0.6 | 0.6 | 0.6 | 0.6 | 0.6 | 0.7 |
| h3 (mm) | — | — | — | 0.4 | 0.4 | 0.4 | 0.4 | 0.4 | 0.4 | 0.4 | 0.4 | 0.4 |
| h3/h2 | — | — | — | 0.3 | 0.2 | 0.3 | 0.3 | 0.3 | 0.3 | 0.3 | 0.3 | 0.3 |
| radius difference ΔR2(mm) | 1.5 | 1.0 | 2.0 | 1.5 | 1.0 | 1.0 | 1.5 | 2.0 | 2.0 | 1.5 | 2.0 | 1.5 |
| radius difference ΔR1(mm) | — | — | — | 0.3 | 0.3 | 0.3 | 0.3 | 0.5 | 0.5 | 0.8 | 0.5 | 0.5 |
| angle θ1 (deg.) | 135.0 | 135.0 | 135.0 | 135.0 | 135.0 | 120.0 | 135.0 | 120.0 | 135.0 | 135.0 | 135.0 | 135.0 |
| number of sector shells | — | — | — | 4 | 4 | 4 | 4 | 4 | 4 | 4 | 4 | 8 |
| thermal expansion coefficient ratio P1/P2 | — | — | — | 1.009 | 1.009 | 1.009 | 1.009 | 1.009 | 1.009 | 1.009 | 1.009 | 1.009 |
| occurrence rate of crack (%) | 5.0 | 0.0 | 20.0 | 0.0 | 0.0 | 0.0 | 0.0 | 0.0 | 0.0 | 0.0 | 0.0 | 0.0 |
| demolding | 3 | 4 | 2 | 3 | 3 | 3 | 3 | 4 | 3 | 3 | 3 | 3 |
| dropping-out of stud (%) | 50.0 | 30.0 | 20.0 | 10.0 | 10.0 | 4.0 | 2.0 | 0.0 | 0.0 | 6.0 | 15.0 | 20.0 |

| Mold pin | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| D1 (mm) | 2.0 | 2.0 | 5.0 | 2.0 | 2.0 | 2.0 | 2.5 | 2.0 | 2.0 |
| D2 (mm) | 5.0 | 5.0 | 5.0 | 9.0 | 5.0 | 5.0 | 2.8 | 8.0 | 5.0 |
| D2/D1 | 2.5 | 2.5 | 1.0 | 4.5 | 2.5 | 2.5 | 1.1 | 4.0 | 2.5 |
| D3 (mm) | 2.5 | 2.5 | 2.5 | 2.5 | 1.5 | 2.5 | 2.5 | 2.5 | 2.0 |
| D3/D1 | 1.3 | 1.3 | 0.5 | 1.3 | 0.8 | 1.3 | 1.0 | 1.3 | 1.0 |
| h1 (mm) | 2.6 | 2.6 | 2.6 | 2.6 | 2.6 | 2.6 | 2.6 | 2.6 | 2.6 |
| h2 (mm) | 1.5 | 1.5 | 1.3 | 1.3 | 1.3 | 1.3 | 1.3 | 1.3 | 1.3 |
| h2/h1 | 0.6 | 0.6 | 0.5 | 0.5 | 0.5 | 0.5 | 0.5 | 0.5 | 0.5 |
| h3 (mm) | 0.4 | 0.4 | 0.4 | 0.4 | 0.4 | 0.4 | 0.4 | 0.4 | 0.4 |
| h3/h2 | 0.3 | 0.3 | 0.3 | 0.3 | 0.3 | 0.3 | 0.3 | 0.3 | 0.3 |
| radius difference ΔR2(mm) | 1.5 | 1.5 | 0.0 | 3.5 | 1.5 | 1.5 | 0.2 | 3.0 | 1.5 |
| radius difference ΔR1(mm) | 0.3 | 0.3 | −1.3 | 0.3 | −0.3 | 0.3 | 0.0 | 0.3 | 0.0 |
| angle θ1 (deg.) | 135.0 | 135.0 | 135.0 | 135.0 | 120.0 | 135.0 | 135.0 | 135.0 | 135.0 |
| number of sector shells | 4 | 4 | 4 | 4 | 4 | 4 | 4 | 4 | 4 |
| thermal expansion coefficient ratio P1/P2 | 1.009 | 1.002 | 1.009 | 1.009 | 1.009 | 1.009 | 1.009 | 1.009 | 1.009 |
| occurrence rate of crack (%) | 0.0 | 0.0 | 0.0 | 80.0 | 0.0 | 80.0 | 0.0 | 90.0 | 0.0 |
| demolding | 3 | 3 | 4 | 1 | 4 | 1 | 4 | 1 | 4 |
| dropping-out of stud (%) | 20.0 | 10.0 | 80.0 | * | 60.0 | * | 70.0 | * | 80.0 |

TABLE 1-continued

| Mold pin | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|
| D1 (mm) | 2.0 | 2.0 | 2.0 | 2.0 | 2.0 | 2.0 | 2.0 | 2.0 | 2.0 |
| D2 (mm) | 5.0 | 5.0 | 5.0 | 5.0 | 5.0 | 5.0 | 5.0 | 5.0 | 5.0 |
| D2/D1 | 2.5 | 2.5 | 2.5 | 2.5 | 2.5 | 2.5 | 2.5 | 2.5 | 2.5 |
| D3 (mm) | 5.5 | 2.5 | 2.5 | 2.5 | 2.5 | 2.5 | 2.5 | 2.5 | 2.5 |
| D3/D1 | 2.8 | 1.3 | 1.3 | 1.3 | 1.3 | 1.3 | 1.3 | 1.3 | 1.3 |
| h1 (mm) | 2.6 | 3.8 | 1.9 | 2.6 | 2.6 | 2.6 | 2.6 | 2.6 | 2.6 |
| h2 (mm) | 1.3 | 1.3 | 1.9 | 1.3 | 1.3 | 1.3 | 1.3 | 1.3 | 1.3 |
| h2/h1 | 0.5 | 0.3 | 1.0 | 0.5 | 0.5 | 0.5 | 0.5 | 0.5 | 0.5 |
| h3 (mm) | 0.4 | 0.4 | 0.4 | 0.8 | 0.4 | 0.4 | 0.4 | 0.4 | 0.4 |
| h3/h2 | 0.3 | 0.3 | 0.2 | 0.6 | 0.3 | 0.3 | 0.3 | 0.3 | 0.3 |
| radius difference ΔR2(mm) | 1.5 | 1.5 | 1.5 | 1.5 | 1.5 | 1.5 | 1.5 | 1.5 | 1.5 |
| radius difference ΔR1(mm) | 1.8 | 0.3 | 0.3 | 0.3 | 0.3 | 0.3 | 0.3 | 0.3 | 0.3 |
| angle θ1 (deg.) | 135.0 | 135.0 | 135.0 | 135.0 | 90.0 | 135.0 | 120.0 | 135.0 | 120.0 |
| number of sector shells | 4 | 8 | 4 | 4 | 4 | 4 | 4 | 2 | 16 |
| thermal expansion coefficient ratio P1/P2 | 1.009 | 1.009 | 1.009 | 1.002 | 1.009 | 1.036 | 0.987 | 1.009 | 1.009 |
| occurrence rate of crack (%) | 100.0 | 100.0 | 100.0 | 100.0 | 100.0 | 100.0 | 100.0 | 100.0 | 100.0 |
| demolding | 1 | 1 | 1 | 1 | 1 | 1 | 1 | 1 | 1 |
| dropping-out of stud (%) | * | * | * | * | * | * | * | * | * |

The invention claimed is:

1. A mold pin used by being fixed to a tread mold for molding a tread of a vehicle tire to form a stud hole in the tread, comprising
a main shaft portion to be fixed at its one end to the tread mold so as to protrude from a tread molding surface of the tread mold, and
an expanded portion disposed at the other end of the main shaft portion and having an outer diameter more than the outer diameter of the main shaft portion,
wherein
the expanded portion comprises a supporting part formed integrally with the main shaft portion, and an a outer-shell part disposed on the outer surface of the supporting part to define the maximum outer diameter of the expanded portion,
the outer-shell part is movably supported by the supporting part such that when a force directed from said one end toward said other end of the main shaft portion is applied to the outer-shell part, the outer-shell part is moved so as to reduce the maximum outer diameter, and
the outer-shell part is made up of a plurality of sector shells, and a radially inside end of each sector shell is connected to the supporting part in a cantilever manner by the use of a connector made of a heat-resistant, flexible and deformable resin.

2. The mold pin according to claim 1, wherein
the supporting part is bulb-shaped,
the outer-shell part closely contacts with the outer surface of the supporting part, and
the volumetric thermal expansion coefficient P1 of the supporting part is the same as or more than the volumetric thermal expansion coefficient P2 of the outer-shell part.

3. The mold pin according to claim 2, wherein
the ratio P1/P2 of the volumetric thermal expansion coefficient P1 of the supporting part and the volumetric thermal expansion coefficient P2 of the outer-shell part is not less than 1.000 and not more than 1.015.

4. The mold pin according to claim 1, wherein
the ratio D2/D1 of the maximum outer diameter D2 of the expanded portion to the outer diameter D1 of the main shaft portion is not less than 1.2 and not more than 3.0.

5. The mold pin according to claim 1,
wherein
the maximum outer diameter of the supporting part is more than the outer diameter of the main shaft portion, and
when each of the sector shells is subjected to a force directed from said one end toward said the other end, a radially outside end of said sector shell is movable about the connector as a point of support to a position inside a cylinder circumscribed with the maximum outer diameter position of the supporting part.

6. A tire mold comprising a tread mold provided with a plurality of the mold pins used by being fixed to said tread mold for molding a tread of a vehicle tire to form a stud hole in the tread, each of said mold pins comprising
a main shaft portion to be fixed at its one end to the tread mold so as to protrude from a tread molding surface of the tread mold, and
an expanded portion disposed at the other end of the main shaft portion and having an outer diameter more than the outer diameter of the main shaft portion,
wherein
the expanded portion comprises a supporting part formed integrally with the main shaft portion, and an a outer-shell part disposed on the outer surface of the supporting part to define the maximum outer diameter of the expanded portion,
the outer-shell part is movably supported by the supporting part such that when a force directed from said one end toward said other end of the main shaft portion is applied to the outer-shell part, the outer-shell part is moved so as to reduce the maximum outer diameter, and
the outer-shell part is made up of a plurality of sector shells, and a radially inside end of each sector shell is connected to the supporting part in a cantilever manner by the use of a connector made of a heat-resistant, flexible and deformable resin.

7. The mold pin according claim 2, wherein
the ratio D2/D1 of the maximum outer diameter D2 of the expanded portion to the outer diameter D1 of the main shaft portion is not less than 1.2 and not more than 3.0.

8. The mold pin according claim 3, wherein
the ratio D2/D1 of the maximum outer diameter D2 of the expanded portion to the outer diameter D1 of the main shaft portion is not less than 1.2 and not more than 3.0.

9. The tire mold as set forth in claim 6, wherein the supporting part of the mold pin is bulb-shaped, the outer-shell part of the mold pin closely contacts with the outer surface of the supporting part, and the volumetric thermal expansion coefficient P1 of said supporting part is the same as or more than the volumetric thermal expansion coefficient P2 of said outer-shell part.

10. The tire mold as set forth in claim 9, wherein the ratio P1/P2 of the volumetric thermal expansion coefficient P1 of the supporting part of the mold pin and the volumetric thermal expansion coefficient P2 of the outer-shell part of the mold pin is not less than 1.000 and not more than 1.015.

11. The tire mold as set forth in claim 6, wherein the ratio D2/D1 of the maximum outer diameter D2 of the expanded portion to the outer diameter D1 of the main shaft portion is not less than 1.2 and not more than 3.0.

12. The tire mold as set forth in claim 6,
wherein
the maximum outer diameter of the supporting part is more than the outer diameter of the main shaft portion, and
when each of the sector shells is subjected to a force directed from said one end toward said the other end, a radially outside end of said sector shell is movable about the connector as a point of support to a position inside a cylinder circumscribed with the maximum outer diameter position of the supporting part.

* * * * *